May 11, 1965 SABURO UEMURA ETAL 3,183,437

METHOD AND APPARATUS FOR WAVE FORM ANALYSIS

Filed Sept. 25, 1959

Inventors
Saburo Uemura
Kazuo Nagase by Hill, Sherman, Meroni, Gross & Simpson Attys.

United States Patent Office 3,183,437

Patented May 11, 1965

3,183,437

METHOD AND APPARATUS FOR WAVE FORM ANALYSIS

Saburo Uemura and Kazuo Nagase, Tokyo, Japan, assignors to Sony Corporation (Sony Kabushikikaisha), Tokyo, Japan, a corporation of Japan Filed Sept. 25, 1959, Ser. No. 842,358
Claims priority, application Japan, Oct. 29, 1958, 31,086/58
16 Claims. (Cl. 324—77)

This invention relates to a method and apparatus for wave form analysis and more particularly to an apparatus and a method in which any desired signal is recorded on a suitable medium as a transverse wave which is analysed so as to clarify the characteristics of the wave.

More particularly this invention relates to a magnetic recording and especially to the boundary displacement type of magnetic recording, for such purposes.

Previous attempts have been made to analyse an electrically or magnetically recorded wave form indicating series of signals or phenomena. However, such previously proposed apparatus or methods had the disadvantage of being unduly complex.

For instance, one of such previously proposed apparatuses has a voltage comparison circuit which operated at a constant level so as to slice a signal. Such slices were counted for analysing the wave form. It is, however, difficult to always obtain a constant voltage level for such voltage comparison circuit and errors frequently occurred owing to the distortion of the wave form.

One object of this invention is to provide a wave form analysis method and apparatus in which signals corresponding to any series of phenomena are recorded on a suitable medium, as a line-like region extending in a transverse wave, which record is, in turn, reproduced by at least one reproducing head having a short effective transverse width extending across and at every level of the transverse wave to determine the unit widths of a number of similar unit bands extending side-by-side across the wave form. The number of pulses produced at the intersection of the wave line of the form and each unit band width as determined by the reproducing head is counted for analysing the wave form.

Another object of this invention is to provide a wave form analyser and method in which a phenomenon is recorded, in the form of transverse wave, based upon the method of boundary-displacement magnetic recording on a magnetic tape and the existence of the signal at every level or unit band width is detected by a reproducing head having a short unit width of transversely extending air gap.

A further object of this invention is to provide a wave form analyser in which a mechanical displacement is recorded magnetically on a magnetic tape by moving a recording head having a direct current magnetizing device in the transverse direction with respect to the advance direction of the tape, and the reproduction is performed from the record by this same means.

A still further object of this invention is to provide a statistical apparatus and method in which the pulse number obtained from the reproduction of the transverse wave is counted or each pulse is integrated to form a rectangular wave form the area of which is used for statistical determinations.

Other objects, features and advantages of this invention will become apparent to those skilled in the art from the following detailed disclosure taken in connection with the accompanying drawing in which, FIG. 1 is a schematic diagram of a wave form analyser, by way of example, embodying this invention.

FIGS. 2A–D, show the diagrammatic representation for illustrating the operation of the wave form analyser shown in FIG. 1.

Figure 1:
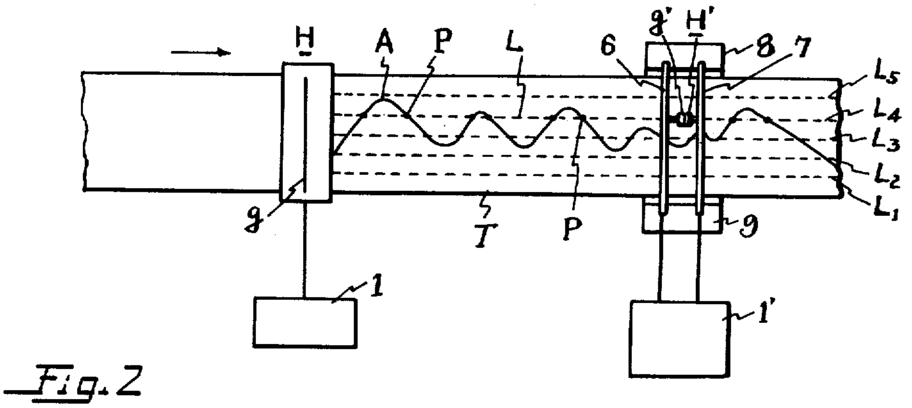
Figure 2:
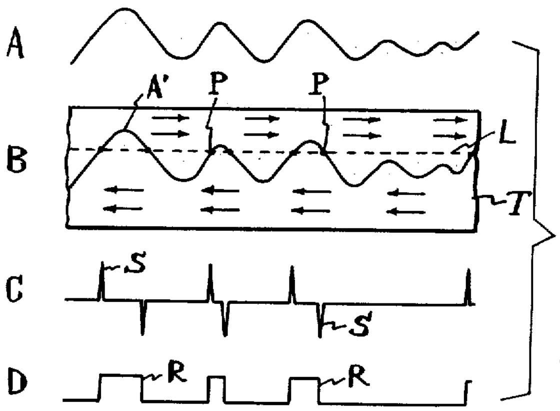

Referring to FIG. 1, T is a magnetic tape which travels in the direction shown by the arrow. H is a boundary-displacement type magnetic recording head which will be hereinafter referred to in FIG. 3 and which has an air gap $g$ the length of which is substantially the same as the width of the tape T. The recording head H is energized by a signal current as shown in FIG. 2A so that the boundary-displacement recording A′ is obtained on the tape T as shown in FIG. 2B. The record A′ is formed as a transverse wave, the upper region being, for example, negatively saturated and the lower region positively saturated.

It is of course that such a record A′ can be made to correspond to any desired phenomenon.

This invention is intended mainly to analyse the characteristics of such a line-like transverse wave form. For this purpose, a reproducing magnetic head H′ which has an air gap $g'$ the length of which is amply small as compared with the width of the tape T is disposed at one and width or level position, for example $L_4$. Thus, the line-like recording or signal A is reproduced for this level position or unit band width when the tape travels in the direction shown by the arrow. Pulse signals S are generated at the points P which correspond to the intersections of the wave form A′ and the head H′.

Any desired detecting device 1′ is connected to the output of the reproducing head. The detecting device may be of the type which counts the number of pulses, or the time interval between pulses or which produces the rectangular wave R formed by the pulses as shown in FIG. 2D.

In order to attain the same reproduction at the respective levels or unit band widths $L_1$ to $L_5$, inclusive, it is preferable to provide means for moving the reproducing head H′ transversely with respect to the advance direction of the tape until the head H′ is set at the predetermined level position. In FIG. 1, two parallel conductors 6 and 7 are provided across the tape T with their two ends supported by insulators 8 and 9. Such a pair of conductors 6 and 7 may be constructed to guide the reproducing head H′ so as to set the head at any desired level position.

It will be understood that the detecting device 1′ can be connected to the conductors 6 and 7. Instead of using a single movable reproducing head, it is also possible to use a plurality of similar reproducing heads which may be arranged on the respective level positions or unit width bands $L_1$ to $L_5$, inclusive, to obtain reproduced pulses simultaneously for all the unit bands or the level positions.

Figure 3:
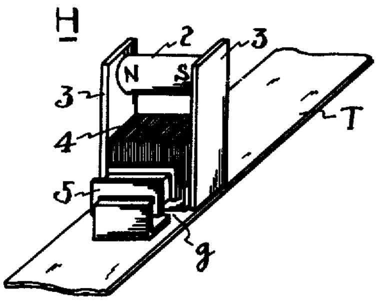
FIG. 3 is a perspective view of a boundary-displacement type magnetic head, by way of example, which is available for recording a signal in the form of transverse wave on a magnetic tape.

FIG. 3 shows a perspective view of one example of the boundary-displacement magnetic recording head, in which 2 is a permanent magnet, 3 a yoke and 4 a lamination stack. 5 represents a head coil which is energized by the output of the signal source 1, which is to be recorded.

In using the boundary-displacement type magnetic recording head the air gap $g$ and the permanent magnet 2 are disposed perpendicularly with respect to the advance direction of the magnetic tape T or longitudinal direction of the tape and the center of the air gap is on the midpoint of the width of the tape.

Then the boundary or line-like region is recorded on the magnetic tape T by the direct current magnetic field established by the permanent magnet 2 so that a boundary-displacement recording is obtained according to the amplitudes of the signal and as shown in FIG. 2B. It will be noted that such a boundary-displacement magnetic recording has been proposed by H. L. Daniels in "Electronics," April 1952.

Figure 4:
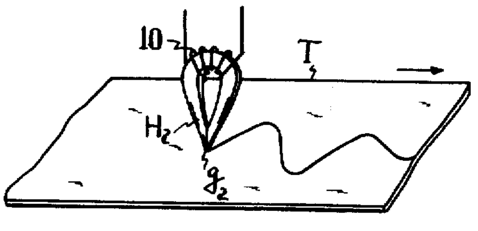
FIG. 4 is a perspective view of an arrangement in which a signal is recorded in the form of transverse wave on a magnetic tape with a recording head having a ring-shaped direct current magnetizing device.

FIG. 4 shows a perspective view of a boundary-displacement type magnetic head $H_2$ which has a direct current magnetizing device for recording a transverse wave signal on the tape. The head $H_2$ is of a ring type and has a short air gap $g_2$. The head is transversely displaced mechanically with respect to the advance direction of the T according to a time series of phenomena or signals so that they can be magnetically recorded in the form of transverse wave when a coil 10 of the head is energized by a direct current.

Figure 5:
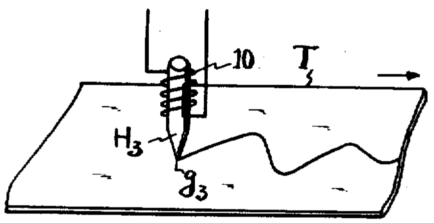
FIG. 5 is a perspective view of an arrangement in which a signal is recorded in the form of transverse wave on a magnetic tape with a recording head having a pen type direct current magnetizing device.

FIG. 5 is a similar perspective view of another boundary-displacement type magnetic head $H_3$.

The head $H_3$ is formed in a pen type which can record the phenomena on the tape similarly in the form of transverse wave.

In the above cases, however, if a permanent magnet is displaced mechanically according to a series of phenomena, the corresponding transverse wave can be equally recorded magnetically and the coil 10 can be dispensed with. Such a recording head having a direct current magnetising apparatus may be connected to a pointer of any suitable meter so as to vibrate the head transversely with respect to the advance direction of the tape. A series of reproduced pulses corresponding to each level or unit band width of the transverse wave signal are produced and used for the same purpose as already described in connection with the arrangement shown in FIG. 1.

While we have explained only certain embodiments of our invention, it will be understood, of course, that we do not wish to be limited thereto since many modifications may be made and we, therefore, contemplate by the appended claims to cover any such modifications as fall within the spirit or scope of our invention.

What is claimed is:

1. In wave form analysis apparatus, in combination, a magnetic recording medium having a magnetically recorded strip-line extending therealong, a magnetic transducing head, means to produce a relatively and substantially constant speed motion between said head and said recording medium, said head having a magnetic gap of a relatively short length extending transversely to said direction of substantially constant speed motion and means to produce relative, lateral motions between said head and said recorded strip transverse to said direction of substantially constant speed motion in a wave whose amplitudes correspond to a signal to be analysed and which amplitudes are materially greater than the said gap length of said head so that said gap length extends across only a small fractional part of the amplitude width of said wave.

2. In wave form analysis apparatus, in combination, a magnetic recording medium having a magnetically recorded strip extending therealong, a magnetic transducing head, means to produce a relative and substantially constant speed motion between said head and said recording medium, said head having a magnetic gap of a relatively short length extending transversely to the direction of said substantially constant speed relative motion and means to produce relative lateral motions between said head and said recorded strip transverse to the direction of said substantially constant speed motion in a wave form whose amplitudes correspond to a signal to be analysed and are materially greater than the said gap length of said head so that said gap length extends across only a small fractional part of the amplitude width of said wave form, said transducer head being a magnetic reproducing head which is fixed in normal use to read pulses along its intersection with said previously recorded strip.

3. In wave form analysis apparatus, in combination, a magnetic recording medium having a magnetically recorded strip extending therealong, a magnetic transducing head, means to produce a relative and substantially constant speed motion between said head and said recording medium, said head having a magnetic gap of a relatively short length extending transversely to the direction of said substantially constant speed relative motion and means to produce relative, lateral motions between said head and said recorded strip transverse to said direction of relatively constant speed motion and in a wave form whose amplitudes correspond to a signal to be analysed and are materially greater than the said gap length of said head so that said gap length extends across only a small fractional part of the amplitude width of said waves, said transducing head being a recording head and being laterally movable relative to said magnetic tape in accordance with the said signal to be recorded and analysed.

4. In a wave form analysing apparatus, a magnetic recording tape having a width, a magnetic recording head, means to produce relatively constant speed motion therebetween, said recording head being of a substantially constant magnetic flux producing type and having a magnetic gap with a relatively short length extending transversely across only a small part of the width of said tape, and means including a source of mechanical vibration operatively connected to said head to vibratingly displace said head transverse to the direction of said relatively constant speed motion in accordance with the signal to be analysed and in amplitudes materially greater than said relatively short length of said gap so that said gap forms only a small fractional part of the amplitude width of the recorded wave form.

5. For use in wave form analysing apparatus, in combination, a magnetic recording tape having a width, means to move said tape along its length at a substantially constant speed, a direct current and substantially constant magnetic flux type recording head having a relatively short effective width to record a boundary displacement stripline along said tape and means to move said head transversely across the width of said tape in amplitudes materially greater than said effective width of said head including a meter means responsive to a phenomenon to be analysed and having a transversely and mechanically vibrating output element operatively connected to said recording head whereby the width of said recording head is only a small fractional part of the amplitudes of the wave form so recorded.

6. In apparatus for the analysis of a time series of phenomena by recording a line-like region extending in a transverse wave form whose amplitudes indicate said phenomena and determining the number of relatively smaller unit band widths extending across said amplitudes that are contained in each of a substantial number of said amplitudes by pulses produced by the intersections of each such unit band width with said line-like wave form; a recording medium having a time indicating length along which said wave form is recorded, a transducing means and means to produce relative motion between said recording medium and said transducing means along said length, said transducing means comprising at least one transducer head having a short effective transducing width extending across said length, said transducing width being less than one-third of most of said amplitudes and substantially the same as the width of one of said unit bands.

7. The apparatus of claim 6 in which said transducer head is a recording head to produce said wave form.

8. The apparatus of claim 6 in which said transducer head is a reproducing head to produce said pulses.

9. The apparatus of claim 6 in which said transducer head is a recording head to produce said wave form as well as a reproducing head to subsequently produce said pulses.

10. In the analysis of a time series of phenomena by the recording along a time measuring length of a line-like region extending in a transverse wave form whose amplitudes indicate said phenomena and then determining the number of relatively smaller unit band widths extending across said amplitudes that are contained in each of a substantial number of said amplitudes by pulses produced by the intersections of each said unit band width with said line-like wave form; the steps of relatively moving a transducer and a recording medium along said time measuring length and simultaneously transducing across at least one short effective transducing width which is less than one-third of most of said amplitudes and is substantially the same as the width of one of said unit bands.

11. The steps of claim 10 in which said transducing is a recording to produce said wave form.

12. The steps of claim 10 in which said transducing is a reproducing to produce said pulses.

13. A wave form analyser comprising a recording medium having a length along which a time series of phenomena are recorded by a line-like region extending in a transverse wave form whose amplitudes extend transversely of said length, means to analyze a substantial number of such phenomena indicating waves by determining the number of small unit band widths extending side-by-side across said amplitudes that are contained in such amplitudes by pulses produced by the intersections of such unit band width with said line-like wave form, said means including at least one reproducing head having an effective short width extending transversely across said amplitudes and determining at least one of said small unit band widths, said width being less than one-third of most of said wave form amplitudes, and means to relatively move said recording medium and said head along said length as a measure of time.

14. The analyser of claim 13 in which said head is adjustably movable from band to band across said amplitudes for successive readings of the pulses for different unit band widths of said wave form during different runs.

15. The analyser of claim 6 in which said head is one of a plurality of similar such heads arranged with their band width determining widths side-by-side across said amplitudes to simultaneously read the pulses for a plurality of different band widths across said wave form during only one run.

16. A wave form analyzer comprising a magnetic recording medium having a length along which a time series of phenomena are magnetically recorded by a boundary-displacement type magnetic recording in a line-like region extending in a transverse wave form whose amplitudes extend transversely of said length, means to analyze a substantial number of such phenomena indicating waves by determining the number of small unit band widths extending side-by-side across said amplitudes that are contained in such amplitudes by pulses produced by the intersections of each such unit band width with said line-like wave form, said means including at least one boundary-displacement type magnetic reproducing head having a transverse magnetic gap with an effective short width extending transversely across said amplitudes and determining at least one of said small unit band widths, said widths being less than one-third of most of said wave form amplitudes, and means to relatively move said recording medium and said head along said length at a substantially constant speed as a measure of time.

References Cited by the Examiner

UNITED STATES PATENTS

| | | | |
|---|---|---|---|
| 1,886,616 | 11/32 | Alverson | 346—74 |
| 2,530,584 | 11/50 | Pontius | 179—100.2 |
| 2,591,738 | 4/52 | Spencer | 324—77 X |
| 2,632,061 | 3/53 | Begun | 179—100.2 |
| 2,743,320 | 4/56 | Daniels et al. | 179—100.2 |
| 2,791,288 | 5/57 | Meier | 340—15 X |
| 2,920,306 | 1/60 | Feagin et al. | 340—15 |

IRVING L. SRAGOW, *Primary Examiner.*

ROBERT H. ROSE, ELI J. SAX, *Examiners.*